(12) United States Patent
Lin et al.

(10) Patent No.: US 11,796,384 B2
(45) Date of Patent: Oct. 24, 2023

(54) DISPLAY DEVICE AND OPTICAL SENSING MODULE THEREOF

(71) Applicant: CHAMP VISION DISPLAY INC., Miao-Li County (TW)

(72) Inventors: Kuo-Lung Lin, Miao-Li County (TW); Yi-Wen Lin, Miao-Li County (TW); Chen-Tsun Juan, Miao-Li County (TW); Hsin-Hung Lee, Miao-Li County (TW); Ching-Hung Chen, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 17/948,250

(22) Filed: Sep. 20, 2022

(65) Prior Publication Data
US 2023/0103153 A1 Mar. 30, 2023

(30) Foreign Application Priority Data
Sep. 27, 2021 (TW) .................................. 110135901

(51) Int. Cl.
*G01J 1/04* (2006.01)
*G09G 5/04* (2006.01)
(52) U.S. Cl.
CPC ........... *G01J 1/0403* (2013.01); *G01J 1/0448* (2013.01); *G01J 1/0474* (2013.01); *G09G 5/04* (2013.01);
(Continued)
(58) Field of Classification Search
CPC ...... G01J 1/0403; G01J 1/0448; G01J 1/0474; G01J 3/506; G09G 5/04;
(Continued)

(56) References Cited

U.S. PATENT DOCUMENTS

| 6,950,098 B2 | 9/2005 | Brabander et al. |
| 7,894,197 B2 | 2/2011 | Hwang et al. |

(Continued)

FOREIGN PATENT DOCUMENTS

| JP | 4734555 | 7/2011 |
| JP | 2012150213 | 8/2012 |

(Continued)

OTHER PUBLICATIONS

"Office Action of Taiwan Counterpart Application", dated Jan. 17, 2023, p. 1-p. 7.
(Continued)

*Primary Examiner* — Brent D Castiaux
(74) *Attorney, Agent, or Firm* — JCIPRNET

(57) ABSTRACT

An optical sensing module, including a frame, a light sensing element, and a diffusion element is provided. The light sensing element is disposed on the frame. The diffusion element is connected to the frame and is disposed above the light sensing element. In a first sensing mode, ambient light passes through the diffusion element before received by the light sensing element to make the optical sensing module to obtain light intensity of the ambient light. In a second sensing mode, the optical sensing module rotates around a first rotation axis to make the light sensing element face a display surface of the display device for receiving image light of the display surface so that the optical sensing module obtains brightness or chromaticity of the display device. A display device having this optical sensing module is also provided.

13 Claims, 8 Drawing Sheets

(52) U.S. Cl.
CPC ............... *G09G 2320/0693* (2013.01); *G09G 2360/144* (2013.01); *G09G 2360/145* (2013.01)

(58) Field of Classification Search
CPC ..... G09G 2320/0693; G09G 2360/144; G09G 2360/145; G09G 2300/00
See application file for complete search history.

(56) References Cited

U.S. PATENT DOCUMENTS

| | | |
|---|---|---|
| 9,074,929 B2 | 7/2015 | Kawata et al. |
| 9,176,005 B2 | 11/2015 | Hogo et al. |
| 10,062,338 B2 | 8/2018 | Hogo |
| 10,553,002 B2 | 2/2020 | Armstrong-Muntner |
| 10,580,341 B2 | 3/2020 | Jia et al. |
| 2008/0316472 A1* | 12/2008 | Hwang ................ G01J 1/02 356/213 |
| 2016/0232828 A1* | 8/2016 | Jia .......................... G01J 3/0205 |

FOREIGN PATENT DOCUMENTS

| | | |
|---|---|---|
| JP | 2012150213 A * | 8/2012 |
| KR | 100775889 | 11/2007 |
| KR | 20130001694 | 3/2013 |

OTHER PUBLICATIONS

"Office Action of Taiwan Counterpart Application", dated May 8, 2023, p. 1-p. 8.

* cited by examiner

DISPLAY DEVICE AND OPTICAL SENSING MODULE THEREOF

CROSS-REFERENCE TO RELATED APPLICATION

This application claims the priority benefit of Taiwan application serial no. 110135901, filed on Sep. 27, 2021. The entirety of the above-mentioned patent application is hereby incorporated by reference herein and made a part of this specification.

BACKGROUND

Technical Field

The disclosure relates to an optical module and an electronic device, and more particularly to an optical sensing module and a display device.

Description of Related Art

At present, most sensors of display devices on the market are fixed on the display devices to detect ambient light brightness. When a user uses a display device in an outdoor environment with brighter ambient light and a detector detects higher ambient light brightness, the display device adjusts display brightness to be brighter to avoid the user from being unable to clearly see the display content of the display device. When the user uses the display device in an indoor environment with insufficient ambient light, the display device adjusts the display brightness to be darker to avoid the user's eyes from being easily damaged due to an excessively bright picture.

However, for brightness and color detection of the display device currently, when a display is to be calibrated, an additional detection element is used to detect the brightness and colors displayed by the display device for subsequent calibration. There is no effective way yet to detect ambient light and display light at the same time.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an optical sensing module, which may be easily integrated on a display device and may provide multiple sensing modes.

The disclosure provides a display device, which may provide multiple sensing modes.

To achieve one or part or all of the above objectives or other objectives, an embodiment of the disclosure provides an optical sensing module adapted to be disposed on a display device. The optical sensing module includes a frame, a light sensing element, and a diffusion element. The light sensing element is disposed on the frame. The diffusion element is connected to the frame and is disposed above the light sensing element. In a first sensing mode, ambient light passes through the diffusion element before received by the light sensing element to make the optical sensing module to obtain light intensity of the ambient light; In a second sensing mode, the optical sensing module rotates around a first rotation axis to make the light sensing element face a display surface of the display device for receiving image light of the display surface, which allows the optical sensing module to obtain brightness or chromaticity of the display device.

To achieve one or part or all of the above objectives or other objectives, an embodiment of the disclosure provides a display device, which includes a display module and an optical sensing module. The display module includes a display surface and a display frame. The display frame wraps around the display surface. The optical sensing module is disposed on the display frame. The optical sensing module includes a frame, a light sensing element, and a diffusion element. The light sensing element is disposed on the frame. The diffusion element is connected to the frame and is disposed above the light sensing element. In a first sensing mode, ambient light passes through the diffusion element before received by the light sensing element, allowing the optical sensing module to obtain light intensity of the ambient light; In the second sensing mode, the optical sensing module rotates around a first rotation axis to make the light sensing element face the display surface for receiving image light of the display surface, which allows the optical sensing module to obtain brightness or chromaticity of the display device.

Based on the above, in an embodiment of the disclosure, the optical sensing module is integrated on the display device and provides multiple calibration modes. In the first sensing mode, the optical sensing module may sense light intensity of the ambient light. In the second sensing mode, the optical sensing module is designed to rotate around the first rotation axis to make a sensing surface of the light sensing element face the display surface of the display device for receiving the image light of the display surface. Therefore, the design of the optical sensing module helps reduce the structure thickness of the display device and allows the display device to be thinner.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
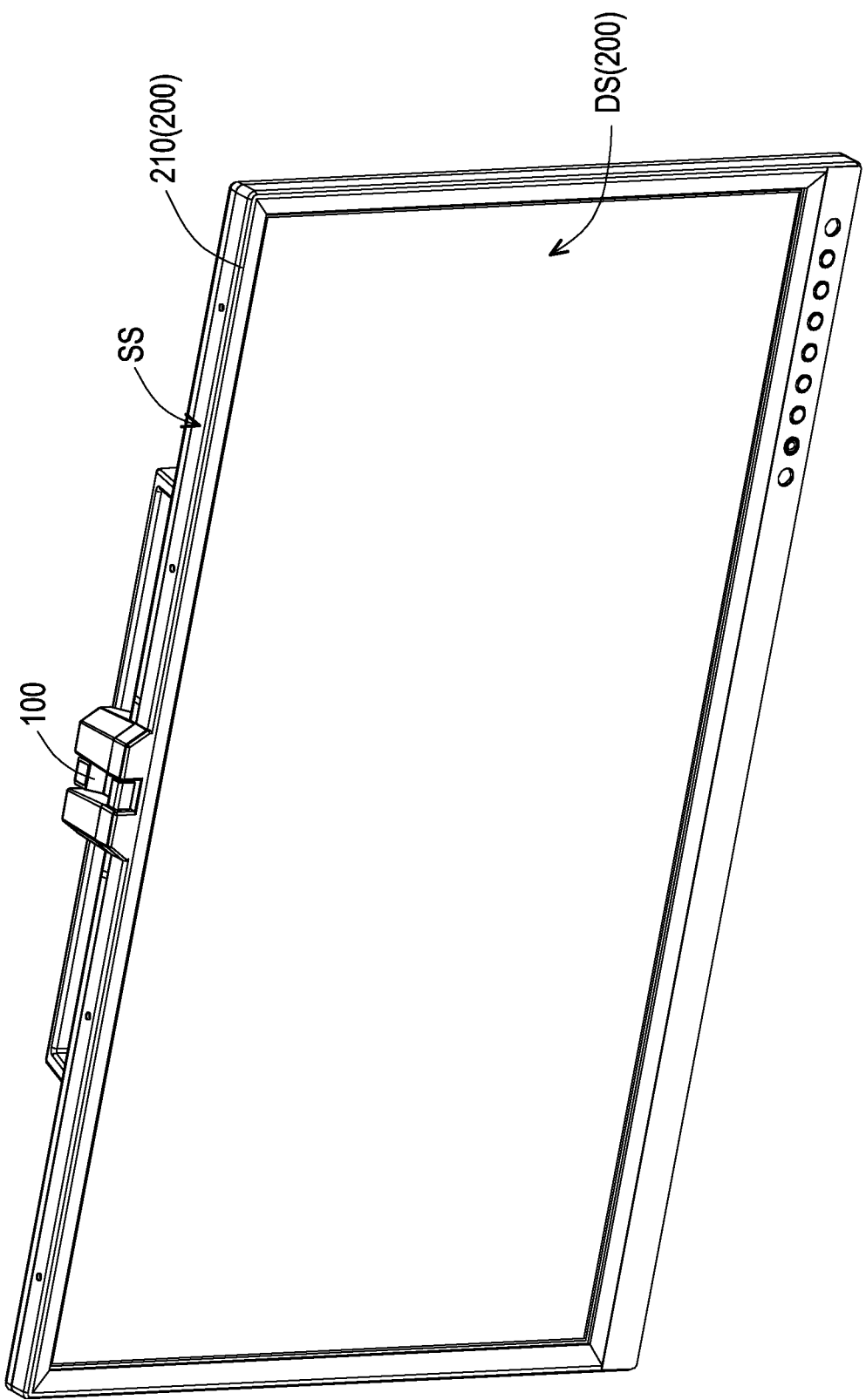
FIG. 1 is a schematic view of an optical sensing module disposed on a display device according to an embodiment of the disclosure.
Figure 2:
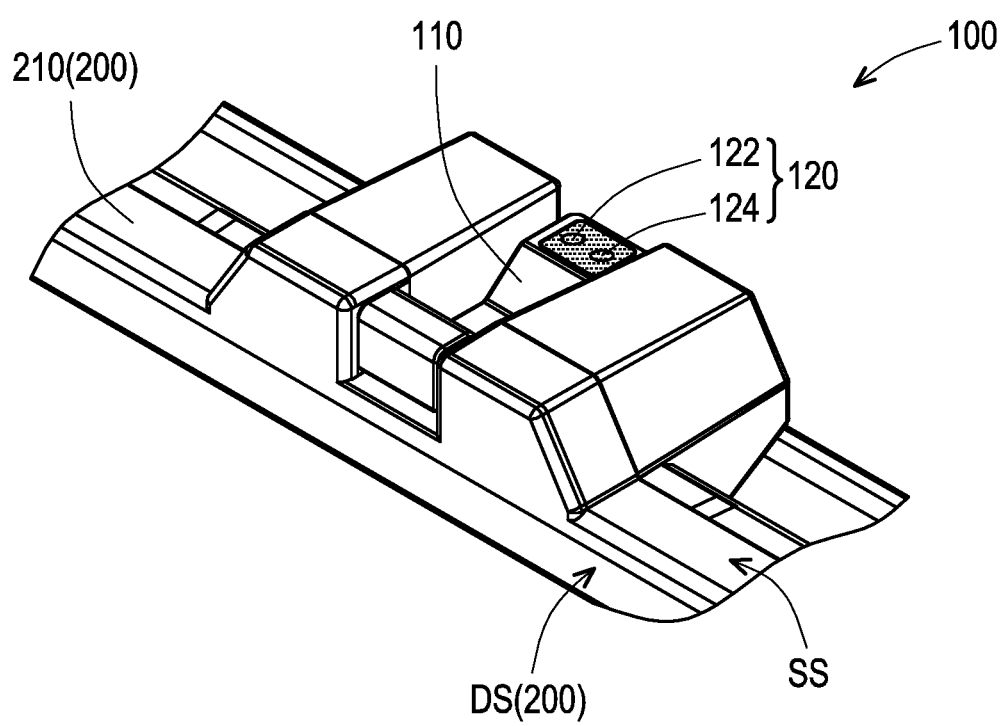
FIG. 2 is an enlarged schematic view of the optical sensing module in FIG. 1.

FIG. 1 is a schematic view of a display device according to an embodiment of the disclosure. FIG. 2 is an enlarged schematic view of an optical sensing module in FIG. 1. Both FIG. 1 and FIG. 2 omit a diffusion element to clearly show the internal structure of the optical sensing module. With reference to FIG. 1 and FIG. 2 together, an embodiment of the disclosure provides a display device 10. The display device 10 includes an optical sensing module 100 and a display module 200. The display module 200 includes a display surface DS and a display frame 210 wrapping around the display surface DS. The optical sensing module 100 is preferably disposed on a side surface SS perpendicular to the display surface in the display frame 210 of the display device 10, but the disclosure is not limited thereto. In an embodiment, the optical sensing module 100 may also be disposed on another position of the display device 10 that does not affect picture presentation.

Figure 3:
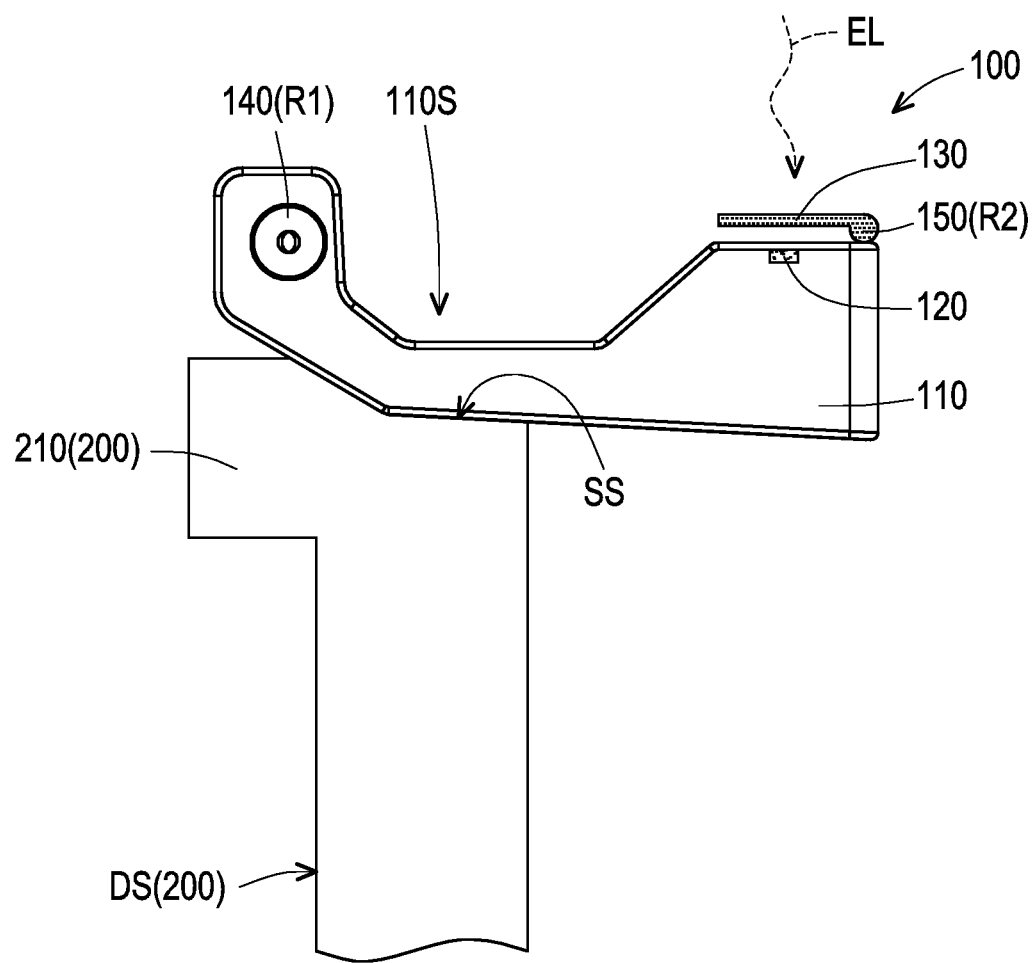
FIG. 3 is a schematic cross-sectional view of the optical sensing module of the display device in FIG. 1 in a first sensing mode.
Figure 4:
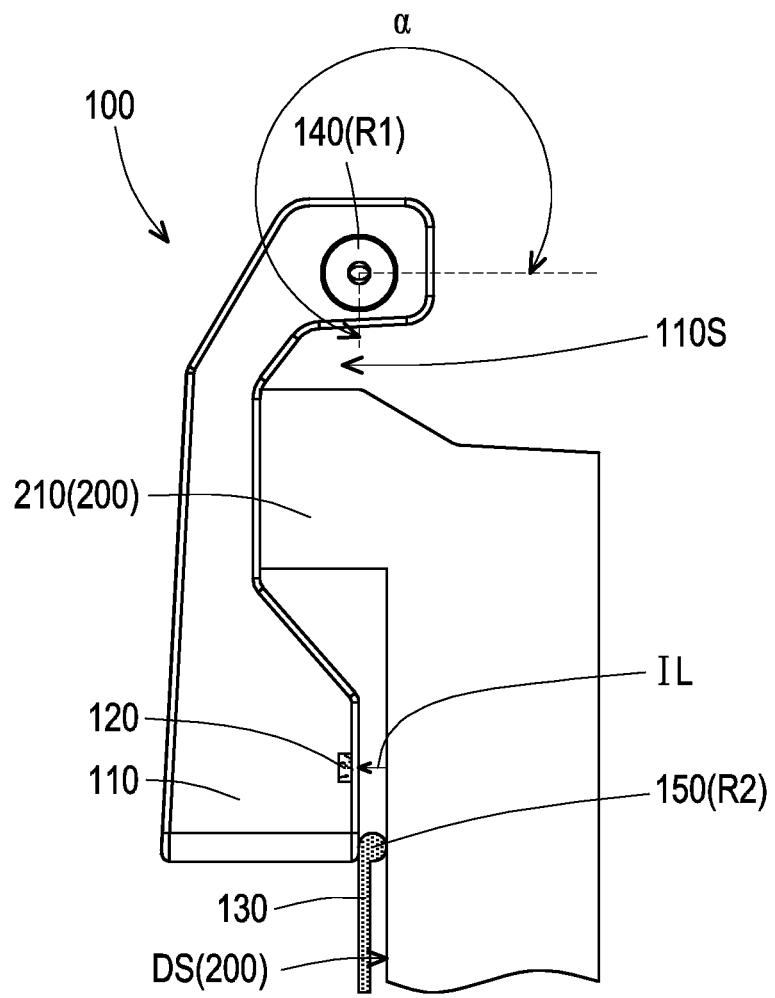
FIG. 4 is a schematic cross-sectional view of the optical sensing module of the display device in FIG. 1 in a second sensing mode.

FIG. 3 is a schematic cross-sectional view of the optical sensing module of the display device in FIG. 1 in a first sensing mode. FIG. 4 is a schematic cross-sectional view of the optical sensing module of the display device in FIG. 1 in a second sensing mode. FIG. 3 and FIG. 4 enlarge the ratio of the optical sensing module to clearly present the position of each element of the optical sensing module and the rotatability of the optical sensing module.

With reference to FIG. 3 first, in this embodiment, the optical sensing module 100 includes a frame 110, a light sensing element 120, and a diffusion element 130. The light sensing element 120 is disposed in the frame 110. For example, the frame 110 has an accommodating concave (not illustrated), in which the light sensing element 120 is disposed, and a sensing surface of the light sensing element 120 faces an opening of this accommodating concave. The diffusion element 130 is connected to the frame 110 and is disposed above the light sensing element 120 to shield the sensing surface of the light sensing element 120. In the first sensing mode, the frame 110 and the display frame 210 are pivotally connected to and are supported by the side surface SS of the display frame 210 through a first rotation axis R1. At this time, the sensing surface of the light sensing element 120 in the frame 110 faces a direction away from the side surface SS. In the first sensing mode, ambient light EL passes through the diffusion element 130 before received by the sensing surface of the light sensing element 120, allowing the optical sensing module 100 to obtain light intensity of the ambient light EL.

With reference to FIG. 4 again, in the second sensing mode of this embodiment, the optical sensing module 100 rotates around the first rotation axis R1 for the frame 110 to be configured on the display surface DS through rotation, making the sensing surface of the light sensing element 120 in the frame 110 face the display surface DS of the display device 10 for receiving image light IL of the display surface DS, which allows the optical sensing module 100 to obtain brightness or chromaticity of the display device 10. Among the above, the optical sensing module 100 rotates around the first rotation axis R1 by an angle α, and the angle α falls within a range of 180 degrees to 270 degrees (FIG. 4 shows the angle α of about 270 degrees). In addition, the frame 110 has a fitting area 1105 near the first rotation axis R1. In the second sensing mode, the frame 110 is fitted with a display frame 210 of a display module 200 at the fitting area 1105.

In this embodiment, the light sensing element 120 includes a first sensing element 122 and a second sensing element 124, as shown in FIG. 2. The first sensing element 122 or the second sensing element 124 may be optical sensors such as complementary metal-oxide semiconductors (CMOS), charge coupled devices (CCD), or photodiodes, but the disclosure is not limited thereto. The first sensing element 122 is used to receive the ambient light EL in the first sensing mode, and the second sensing element 124 is used to receive the image light IL in the second sensing mode, but they are not limited thereto. In other embodiments, the first sensing element 122 and the second sensing element 124 may also be implemented through one single sensing element, which means one single sensing element respectively receives the ambient light EL and the image light IL in the first sensing mode and the second sensing mode.

In this embodiment, the diffusion element 130 may be a diffusion membrane and is pivotally connected to the frame 110 through a second rotation axis R2. When the first sensing mode is switched into the second sensing mode, the diffusion element 130 rotates around the second rotation axis R2 by 180 degrees so that the diffusion element 130 no longer shields the sensing surface of the light sensing element 120, and thus the light sensing element 120 is exposed. In other words, in the second sensing mode, the image light IL is directly received by the light sensing element 120 without passing through the diffusion element 130. The first rotation axis R1 and the second rotation axis R2 are respectively disposed on two opposite sides of the frame 110 in case the diffusion element 130 is unable to rotate due to mutual interference of the diffusion element 130 and the display module 200 if the second rotation axis R2 rotates the diffusion element 130 after rotation of the first rotation axis R1.

Figure 5:
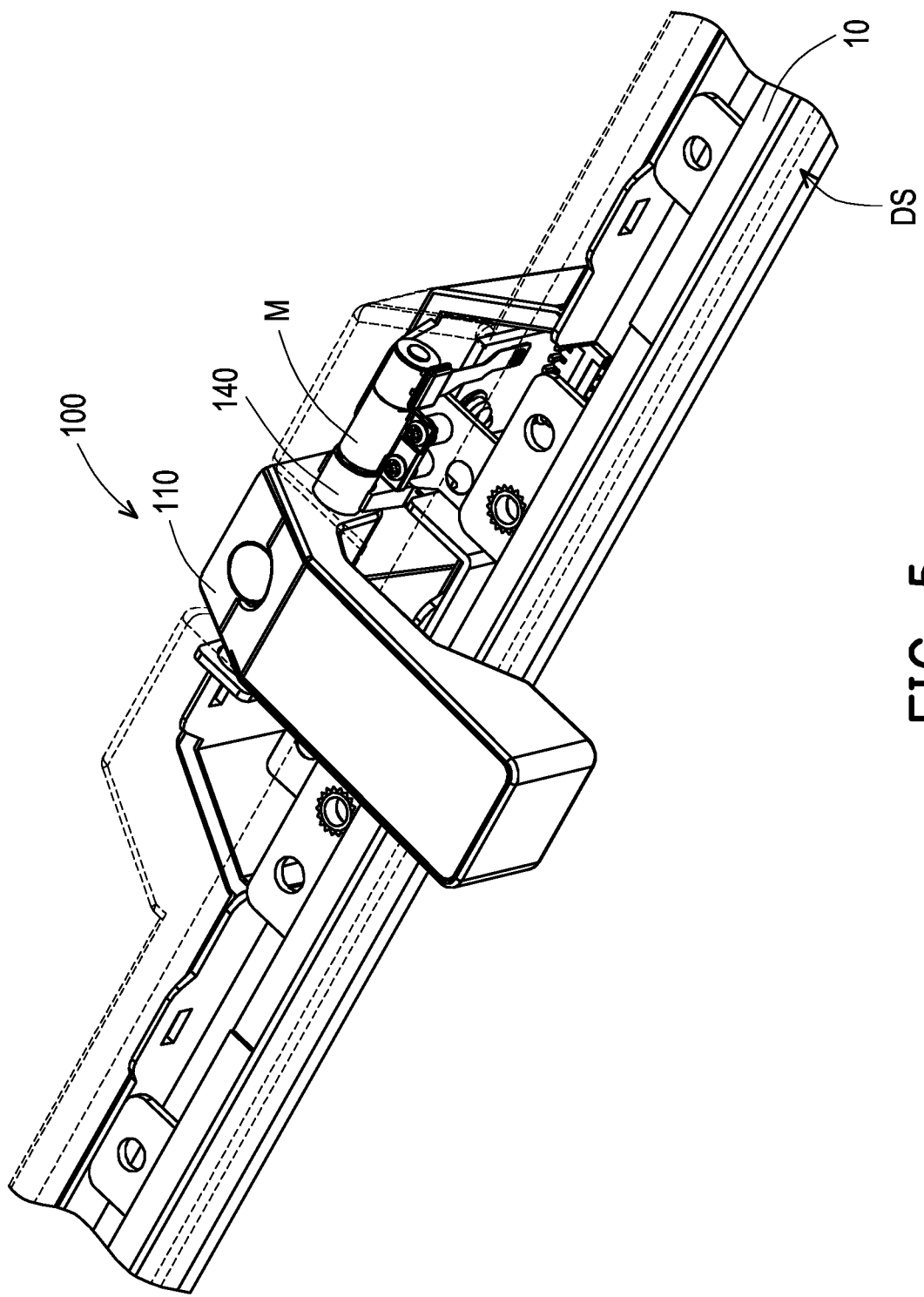
FIG. 5 is a schematic perspective view of the optical sensing module in the second sensing mode through operation of a first motor according to the first embodiment of the disclosure.
Figure 6:
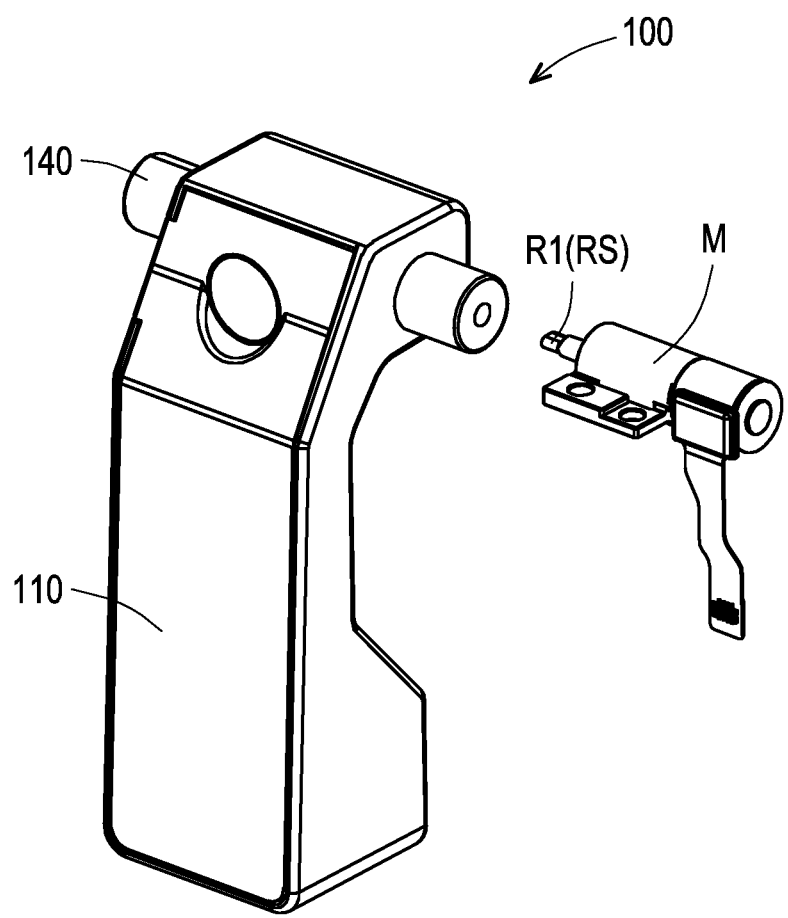
FIG. 6 is an exploded view of the optical sensing module in FIG. 5.

FIG. 5 is a schematic perspective view of the optical sensing module in the second sensing mode through operation of a first motor according to the first embodiment of the disclosure. FIG. 6 is an exploded view of the optical sensing module in FIG. 5. With reference to FIG. 3 to FIG. 6, in this embodiment, the optical sensing module 100 further includes a first motor M and a first engaging structure 140. A rotation shaft RS of the first motor M has the first rotation axis R1 and is connected to the display device 10. The first engaging structure 140 is connected to the frame 110 and engages with the rotation shaft RS of the first motor M. The optical sensing module 100 rotates around the first rotation axis R1 through operation of the first motor M.

In an embodiment, the optical sensing module 100 further includes a second motor and a second engaging structure 150 (the second motor is not illustrated, but the connection mechanism of the second motor and the second engaging structure 150 is similar to that of the first motor M and the first engaging structure 140). Similarly, the rotation shaft of the second motor has the second rotation axis R2 and is connected to the frame 110. The second engaging structure 150 is connected to the diffusion element 130 and engages with the rotation shaft of the second motor. The diffusion element 130 rotates around the second rotation axis R2 through operation of the second motor.

Based on the above, in an embodiment of the disclosure, the optical sensing module 100 has the first sensing mode detecting light intensity of the ambient light EL and the second sensing mode detecting brightness or chromaticity of the display device 10, thereby providing the display device 10 with multiple display calibration ways. In the first sensing mode, the optical sensing module 100 may be designed to be disposed on the display device 10 to make the sensing surface of the light sensing element 120 face a side which avoids receiving the image light IL; for example, the optical sensing module 100 is disposed on the side surface SS of the display device 10 to make the sensing surface of the light sensing element 120 face away from the side surface SS and the display surface DS, thereby avoiding the interference of the image light IL. In the second sensing mode, the optical sensing module 100 is designed to rotate around the first rotation axis R1 to make the sensing surface of the light sensing element 120 face the display surface DS of the display device 10. Therefore, the optical sensing module 100 may be disposed on any position of the display frame 210 of the display device 10, which helps reduce the structure thickness of the display device 10 and allows the display device 10 to be thinner.

Furthermore, since the display device 10 uses the first motor M and the second motor to respectively rotate the optical sensing module 100 and the diffusion element 130, the effect of automatic detection may be achieved.

In another embodiment of the disclosure, the diffusion element 130 of the optical sensing module 100 is a dimming film fixed on the frame 110, which means the diffusion element 130 is located above the light sensing element 120 to shield the sensing surface of the light sensing element 120 in both the first sensing mode and the second sensing mode, without requiring the foregoing second motor and the second engaging structure 150 to rotate the diffusion element 130. The dimming film is, for example, a polymer dispersed liquid crystal (PDLC). In the first sensing mode, the diffusion element 130 switches into a semi-fog mode. In the second sensing mode, the diffusion element 130 switches into a transparent mode. The control method of the diffusion element 130 is, for example, being driven by voltage. In other words, in the second sensing mode of this embodiment, the image light IL passes through the diffusion element 130 and is received by the sensing surface of the light sensing element 120. Advantages of the optical sensing module 100 of this embodiment are similar to those of the optical sensing module 100 in FIG. 4, and details are not described herein.

Figure 7:
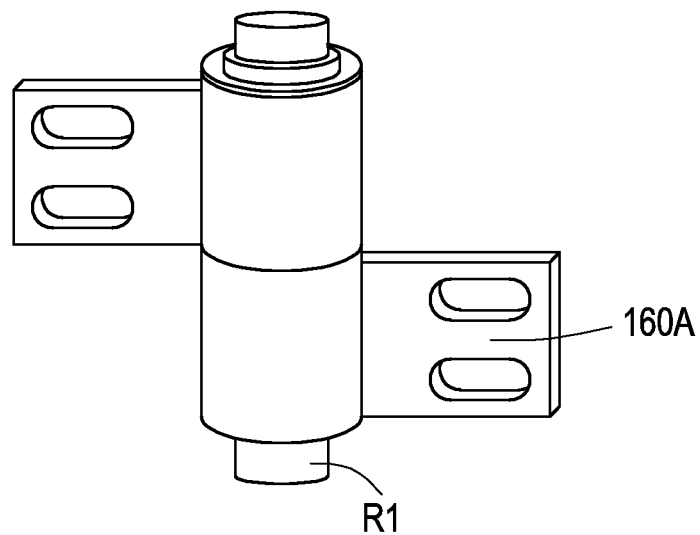
FIG. 7 is a schematic view of a different first hinge structure.
Figure 7:
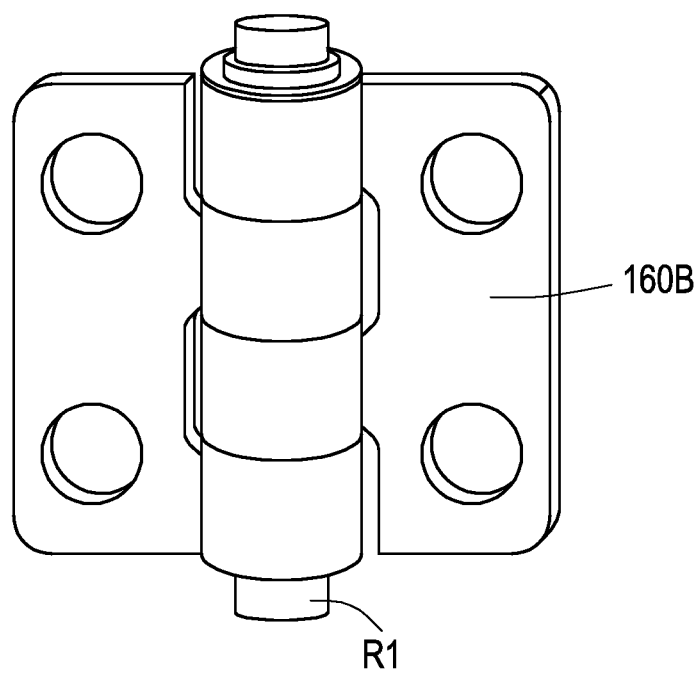

FIG. 7 is a schematic view of a different first hinge structure. With reference to FIG. 7, in this embodiment, the optical sensing module further includes first hinge structures 160A and 160B or first pivot structures, which have the first rotation axis R1 and both ends of which are respectively connected to the frame 110 and the display device 10. Among the above, the first pivot structure is, for example but not limited to, a pivot joint.

In this embodiment, the optical sensing module 100 further includes second hinge structures or second pivot structures (the second hinge structures or second pivot structures are not illustrated but are connected to the frame 110 and the diffusion element 130 in a mechanism similar to that of the first hinge structures 160A and 160B or the first pivot structures), which have the second rotation axis R2 and both ends of which are respectively connected to the frame 110 and the diffusion element 130.

Based on the above, in an embodiment of the disclosure, the frame 110 and the display device 10 are connected through the first hinge structures 160A and 160B or the first pivot structures, while the frame 110 and the diffusion element 130 are connected through the second hinge structures or the second pivot structures. Therefore, although the optical sensing module only performs semi-automatic detection, the cost is relatively low. Other advantages of the optical sensing module of this embodiment are similar to those of the optical sensing module 100 in FIG. 4, and details are not described herein.

Figure 8:
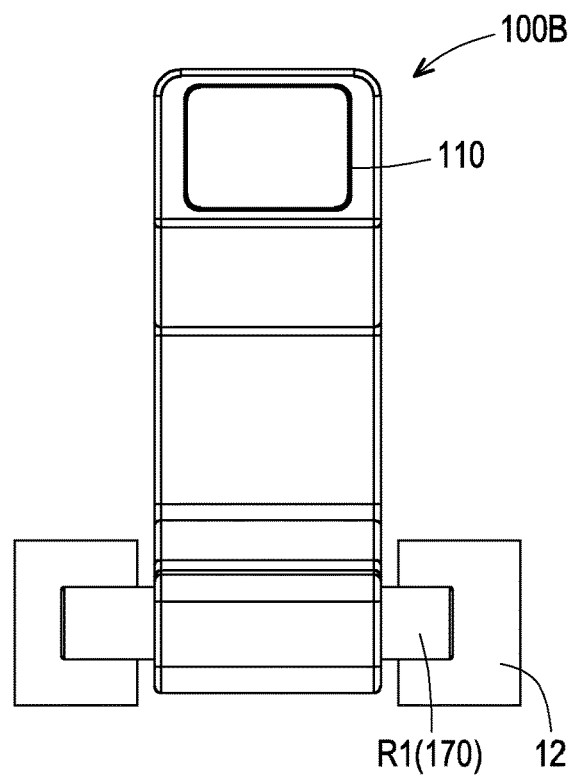
FIG. 8 is a schematic view of the optical sensing module engaging with a first engaging concave of the display device through a first rotation axis according to the third embodiment of the disclosure.

FIG. 8 is a schematic view of the optical sensing module engaging with a first engaging concave of the display device through the first rotation axis according to the third embodiment of the disclosure. With reference to FIG. 8, an optical sensing module 100B is similar to the optical sensing module 100 in FIG. 4, and the main differences are as follows. In this embodiment, the optical sensing module 100B further includes a first shaft 170. The first shaft 170 is connected to the frame 110 and has the first rotation axis R1. The first shaft 170 engages with a first engaging concave 12 of the display device 10. Since the frame 110 and the display device 10 are connected through the first shaft 170, the optical sensing module 100B only performs semi-automatic detection, but the cost is relatively low. Other advantages of the optical sensing module 100B of this embodiment are similar to those of the optical sensing module 100 in FIG. 4, and details are not described herein.

Figure 9:
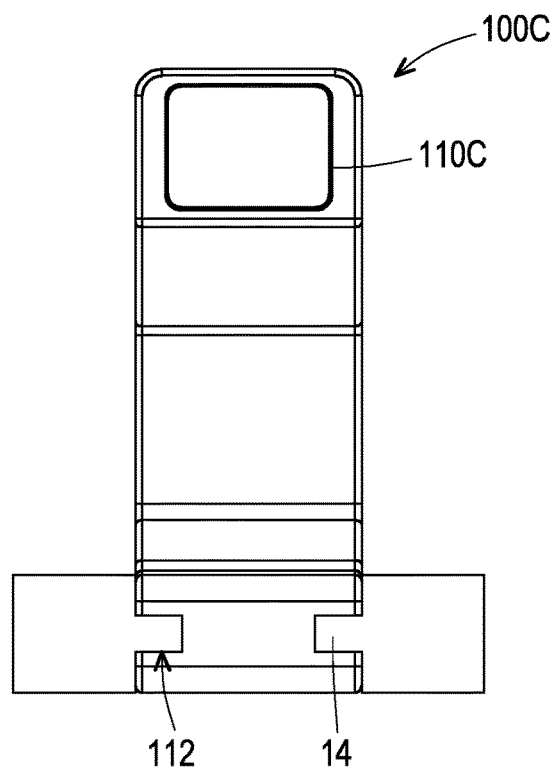
FIG. 9 is a schematic view of the optical sensing module engaging with a second shaft of the display device through a second engaging concave according to the fourth embodiment of the disclosure.

FIG. 9 is a schematic view of the optical sensing module engaging with a second shaft of the display device through a second engaging concave according to the fourth embodiment of the disclosure. With reference to FIG. 9, an optical sensing module 100C is similar to the optical sensing module 100 in FIG. 4, and the main differences are as follows. In this embodiment, a frame 110C has a second engaging concave 112. The second shaft 14 of the display device 10 engages with the second engaging concave 112, and the second shaft 14 has the first rotation axis R1. Since the frame 110C and the display device 10 are connected through the second engaging concave 112, the optical sensing module 100C only performs semi-automatic detection, but the cost is relatively low. Other advantages of the optical sensing module 100C of this embodiment are similar to those of the optical sensing module 100 in FIG. 4, and details are not described herein.

In summary, in an embodiment of the disclosure, the optical sensing module is integrated on the display device and provides multiple calibration modes. In the first sensing mode, the optical sensing module may be designed to be disposed on the display device to make the sensing surface of the light sensing element 120 face the side which avoids receiving the image light, thereby avoiding the interference of the image light. In the second sensing mode, the optical sensing module is designed to rotate around the first rotation axis to make the sensing surface of the light sensing element 120 face the display surface of the display device for receiving the image light. Therefore, the optical sensing module may be disposed on any position of the display frame of the display device, which helps reduce the structure thickness of the display device and allows the display device to be thinner.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention," or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical sensing module, adapted to be disposed on a display device, comprising:
   a frame;
   a light sensing element, disposed on the frame; and
   a diffusion element, connected to the frame, and disposed above the light sensing element; wherein
   in a first sensing mode, ambient light passes through the diffusion element before received by the light sensing element to make the optical sensing module obtain light intensity of the ambient light; and
   in a second sensing mode, the optical sensing module rotates around a first rotation axis to make the light sensing element face a display surface of the display device for receiving image light of the display surface so that the optical sensing module obtains brightness or chromaticity of the display device,
   wherein in the second sensing mode, the diffusion element rotates around a second rotation axis by 180 degrees to expose the light sensing element.

2. The optical sensing module according to claim 1, wherein the light sensing element comprises a first sensing element and a second sensing element, the first sensing element is used to receive the ambient light in the first sensing mode, and the second sensing element is used to receive the image light in the second sensing mode.

3. The optical sensing module according to claim 1, wherein in the second sensing mode, the optical sensing module rotates around the first rotation axis by an angle, and the angle falls within a range of 180 degrees to 270 degrees.

4. The optical sensing module according to claim 1, further comprising a first hinge structure or a first pivot structure, which has the first rotation axis and both ends of which are respectively connected to the frame and the display device.

5. The optical sensing module according to claim 1, further comprising:
   a first motor, a rotation shaft of which has the first rotation axis and is connected to the display device; and
   a first engaging structure, connected to the frame, and engaging with the rotation shaft of the first motor, wherein the optical sensing module rotates around the first rotation axis through operation of the first motor.

6. The optical sensing module according to claim 1, further comprising a first shaft, connected to the frame, and having the first rotation axis, wherein the first shaft engages with a first engaging concave of the display device.

7. The optical sensing module according to claim 1, wherein the frame has a second engaging concave, a second shaft of the display device engages with the second engaging concave, and the second shaft has the first rotation axis.

8. The optical sensing module according to claim 1, wherein the diffusion element is a diffusion membrane.

9. The optical sensing module according to claim 8, further comprising a second hinge structure or a second pivot structure, which has the second rotation axis and both ends of which are respectively connected to the frame and the diffusion element.

10. The optical sensing module according to claim 8, further comprising:
a second motor, a rotation shaft of which has the second rotation axis and is connected to the frame; and
a second engaging structure, connected to the diffusion element, and engaging with the rotation shaft of the second motor, wherein the diffusion element rotates around the second rotation axis through operation of the second motor.

11. An optical sensing module, adapted to be disposed on a display device, comprising:
a frame;
a light sensing element, disposed on the frame; and
a diffusion element, connected to the frame, and disposed above the light sensing element; wherein
in a first sensing mode, ambient light passes through the diffusion element before received by the light sensing element to make the optical sensing module obtain light intensity of the ambient light; and
in a second sensing mode, the optical sensing module rotates around a first rotation axis to make the light sensing element face a display surface of the display device for receiving image light of the display surface so that the optical sensing module obtains brightness or chromaticity of the display device,
wherein the diffusion element is a dimming film, fixed on the frame, wherein:
in the first sensing mode, the diffusion element switches into a semi-fog mode; and
in the second sensing mode, the diffusion element switches into a transparent mode.

12. A display device, comprising:
a display module, comprising:
a display surface; and
a display frame, wrapping around the display surface; and
an optical sensing module, disposed on the display frame, comprising:
a frame;
a light sensing element, disposed on the frame; and
a diffusion element, connected to the frame, and disposed above the light sensing element; wherein
in a first sensing mode, ambient light passes through the diffusion element before received by the light sensing element to make the optical sensing module to obtain light intensity of the ambient light; and
in a second sensing mode, the optical sensing module rotates around a first rotation axis to make the light sensing element face the display surface for receiving image light of the display surface so that the optical sensing module obtains brightness or chromaticity of the display device,
wherein in the second sensing mode, the diffusion element rotates around a second rotation axis by 180 degrees to expose the light sensing element.

13. A display device, comprising:
a display module, comprising:
a display surface; and
a display frame, wrapping around the display surface; and
an optical sensing module, disposed on the display frame, comprising:
a frame;
a light sensing element, disposed on the frame; and
a diffusion element, connected to the frame, and disposed above the light sensing element; wherein
in a first sensing mode, ambient light passes through the diffusion element before received by the light sensing element to make the optical sensing module to obtain light intensity of the ambient light; and
in a second sensing mode, the optical sensing module rotates around a first rotation axis to make the light sensing element face the display surface for receiving image light of the display surface so that the optical sensing module obtains brightness or chromaticity of the display device,
wherein the diffusion element is a dimming film, fixed on the frame, wherein:
in the first sensing mode, the diffusion element switches into a semi-fog mode; and
in the second sensing mode, the diffusion element switches into a transparent mode.

\* \* \* \* \*